United States Patent [19]

Bourdon et al.

[11] Patent Number: 4,699,579
[45] Date of Patent: Oct. 13, 1987

[54] APPARATUS FOR MAKING AN EXTRUDED COMPOSITE STRUCTURE

[75] Inventors: Raymond Bourdon; Paul Kunesch, both of Moneim; Andre Cazes, Pau, all of France

[73] Assignee: Atochem, France

[21] Appl. No.: 803,077

[22] Filed: Nov. 27, 1985

[30] Foreign Application Priority Data

Dec. 18, 1984 [FR] France ............................... 84 19366
Dec. 18, 1984 [FR] France ............................... 84 19367

[51] Int. Cl.$^4$ ............................................. B29C 47/22
[52] U.S. Cl. .................................... 425/113; 264/174; 425/114; 425/122
[58] Field of Search ................... 425/113, 114, 378 R, 425/72, 192 R, 122, 461, 568, 133.1; 156/436; 264/174, 103, 12, 279, 167, 237, 169, 211.14

[56] References Cited

U.S. PATENT DOCUMENTS 2,408,398 10/1946 Johnson ............................. 425/133.1
2,437,263 3/1948 Manning ......................... 264/211.14
3,239,884 3/1966 Seidel et al. ......................... 156/436
3,694,131 3/1972 Stuart ................................. 425/113
3,707,593 12/1972 Fukada et al. ................. 264/211.14
3,844,097 10/1974 Bobkowicz et al. ............... 264/103
3,937,772 2/1976 Urban et al. ......................... 264/12
3,947,172 3/1976 Myers .................................. 425/113

FOREIGN PATENT DOCUMENTS 40-921 1/1965 Japan ................................. 425/113

Primary Examiner—Jay H. Woo
Assistant Examiner—Karl D. Sturge
Attorney, Agent, or Firm—Sigalos & Levine

[57] ABSTRACT

An extruded composite structure consisting essentially of an outer sheath surrounding an inner core, said outer sheath consisting essentially of an extrudable resin which remains thermoplastic after extrusion and said inner core comprising a substance whose melting point or decomposition temperature is lower than the temperature to which said resin must be heated to be extruded and to the apparatus and process for making such composite structure.

10 Claims, 1 Drawing Figure

APPARATUS FOR MAKING AN EXTRUDED COMPOSITE STRUCTURE

BACKGROUND OF THE INVENTION

This invention pertains to a composite extruded structure comprising a continuous resin sheath and an inner core comprising a substance whose melting point or decomposition temperature is lower than the melting termperature of the thermoplastic material of the sheath and to the process and apparatus for making such structure.

Composite structures consisting of a core sheathed with thermoplastic material are known; these generally involve materials having metal cores, for example, as in the case of electric cables or wires. Techniques adapted for such types of manufacture, such as that described in U.S. Pat. No. 3,764,642, make it possible to manufacture only composite materials wherein the core is insensitive not only to the melting temperature of the material constituting the sheath, but also to that of the extrusion die. This is also the case for French Patent No. 2,021,601, which describes a die making it possible to sheath a very long thermoplastic material which has a melting point higher than that of the sheath (page 8, lines 28–30) and is thus not fragile at the extrusion temperature of said sheath. These composites are usually manufactured by extrusion by having the wire, which in most cases is metal, pass through the sheathing die. With such a method, it is thus entirely impossible to manufacture a composite whose core cannot tolerate the extrusion temperature of the sheath.

According to European Patent No. 0133825, it is only possible to obtain a composite structure wherein the melting temperature of the core is at best equal to that of the sheath; i.e., a material having a core which is not sensitive to the sheathing temperature under known operating conditions.

U.S. Pat. No. 3,239,884 describes a die tool which makes it possible to sheath a cable which is sensitive to thermal effects. The apparatus making it possible to sheath a cable consists of a die tool represented by a tubular die and a punch and a tubular cable guide. This guide fitted with an internal cooling device is placed in axial alignment with the outlet land of the die tool which forms the internal wall of the sheath, while keeping open a channel which allows the circulation of compressed air or allows the creation of a vacuum between the cable, the guide, and sheath, with the interface between the cable and the sheath ensuring sealing and continuity between the guide conduit and the channel.

According to this apparatus, if a stream of air is used as the cooling means, it comes directly into contact with the interface between the cable and sheath. Direct impingement of the cooling stream is not a problem when only a single cable is being sheathed: all that is necessary is to control it properly so as not to disturb the sheathing process.

The situation is entirely different when a core which is particularly fragile, either thermally or mechanically, is being sheathed, as, for example, in the case of sheathing extremely fine-fiber rovings and/or powders. In the case of the apparatus according to said U.S. Pat. No. 3,239,884, it is not possible to ensure control of the airflow in cases where fiber rovings are being sheathed, which leads to irregularities in the formation of the sheath. The same applies in the case where powders are being sheathed, since they tend to back up either in the guide or in the air-outlet channel depending on the direction of the airflow, inevitably leading to blockage at some point in the apparatus, which at best produces breakage of the extruded material and at worst leads to decomposition of the materials due to blockage of the die.

SUMMARY OF THE INVENTION

The present invention overcomes these drawbacks by providing a process and apparatus to make extruded composite structures having an inner core with a substance whose melting point or decomposition temperature is lower than the temperature at which the sheathing resin must be heated to be extruded.

Briefly, the present invention comprises an extruded composite structure consisting essentially of an outer sheath surrounding an inner core, said outer sheath consisting essentially of an extrudable resin which remains thermoplastic after extrusion and said inner core comprising a substance whose melting point or decomposition temperature is lower than the temperature to which said resin must be heated to be extruded.

The invention also comprises the apparatus and process as herein described.

DETAILED DESCRIPTION

Figure 1:
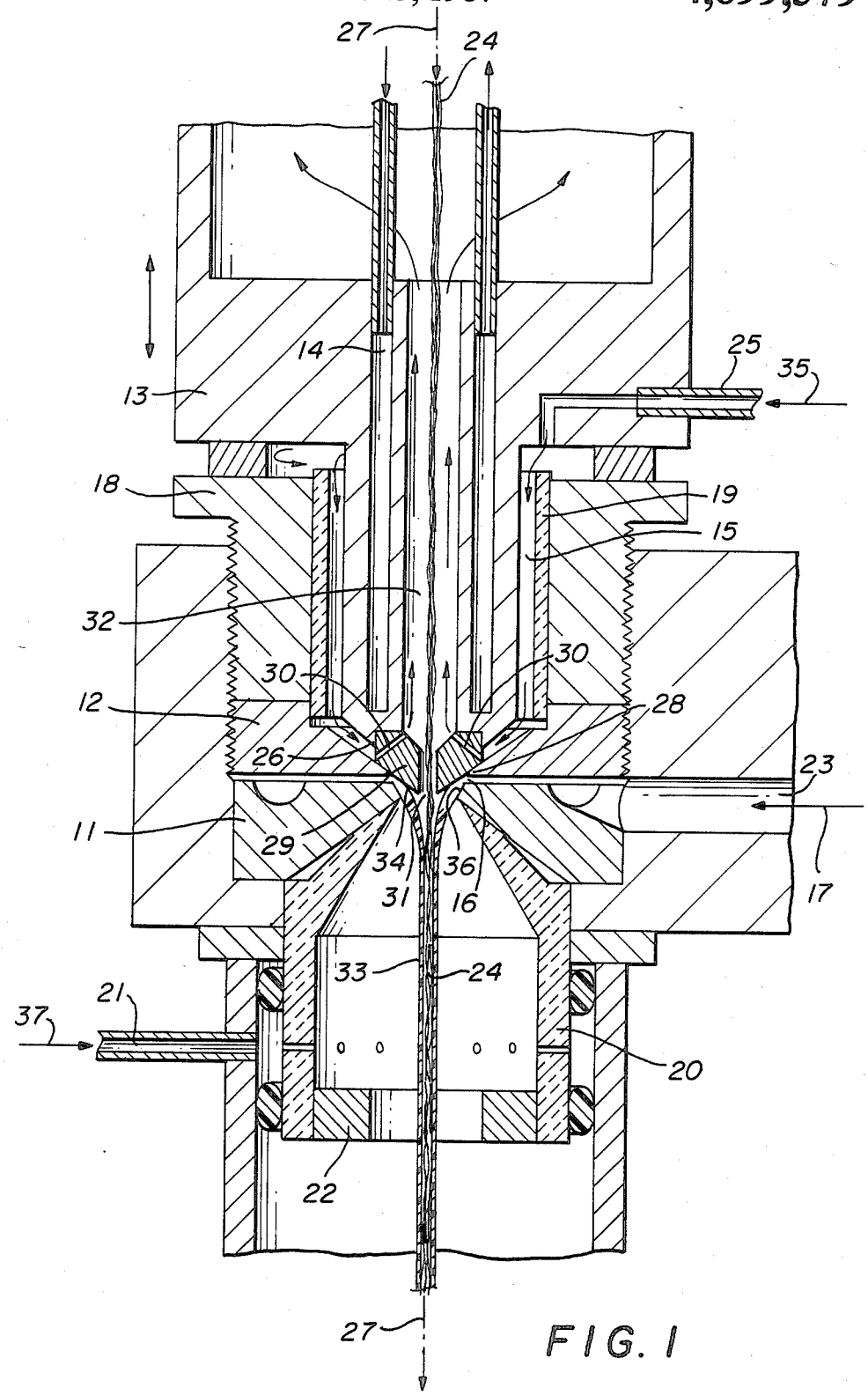
FIG. 1 is a sectional view of the apparatus of the present invention.

Referring to the drawing, the apparatus comprises a die tool 10 represented by a tubular die 11 and a punch 12 and a tubular guide 13 for the core. This guide 13, optionally cooled if necessary by means of the system 14, is arranged so that its outlet end 26 substantially terminates in alignment with and preferably substantially coaxial with or along the axis 27 of the outlet land 28 of the die tool 10, which outlet land 28 forms the inner wall of the sheath; i.e., substantially in alignment with the punch 12, while maintaining a channel 15 for a cooling means 35 such as a cooling fluid 35 which can pass as far as the outlet channel 16 for the die-tool material.

The novelty of this guide 13 is that its outlet end 26 terminates in a nozzle 29 perforated with lateral holes 30. In addition, the diameter of the outlet port 31 or the outlet channel 31 of the nozzle 29, which is preferably along the axis 27 of the guide channel 32, while being larger than that of the core 24 passing through the guide 13, is less than the internal diameter of the rest of the guide 13. The importance of this nozzle 29 shown on the FIG. 1 at the tip 26 of the guide 13 is that it controls the cooling fluids 35, generally a stream of air 35, which arrives through the channel 15. This cooling means, partly or totally deflected by the lateral holes 30 in the nozzles 29, impinges with less force on the material 24 which constitutes the core 24 and on the sheath 33 as it is formed at the sheath material outlet channel 16. This arrangement is of particular interest when the core 24, more or less, partially consists of powder. By shifting the guide 13 so that the tip 34 of the nozzle comes into contact with the punch 12, it is possible, as shown in the figure to completely block off the channel 15 upstream of the outlet land 28 of the die tool which forms the internal wall of the sheath 33. In this case where the cooling fluid is totally blocked off, it is deflected by the lateral holes 30 in the nozzle 29 or in other words permitted to change direction and directed to the interior 32 of the guide 13 without coming into direct contact with the sheath 33. The number of lateral holes 30 is at least two, placed opposite one another; however, for proper operation of the apparatus, it is preferable to have a ring of holes 30 as by multiple holes 30 preferably evenly spaced around the nozzle 29.

In a conventional and incidental manner, the die tool 10 representing the die-punch 11–12 assembly is usually mounted in a crosshead 17, with the assembly being secured with a clamping nut 18. To improve the thermal insulation of the guide 13, it is possible to coat the hot walls of the passage 15 with an insulating material 19 to serve as a supplementary thermal insulator 19.

To minimize the effects of heat radiation from the extrusion-die tool, it is recommended that a thermal barrier 20 be placed directly at the outlet of the die tool, with the best results being obtained with a barrier which begins at the level of the external outlet land 36 of the die 11 which outlet land 36 forms the exterior wall of said sheath 33. The efficiency of the barrier 20 can be improved by any attached cooling means, for example, passage of a stream 37 of air through the conduit 21; said stream 37 of air can additionally serve to maintain counter-pressure on the extruded material by means of an airflow reducer 22. The apparatus as a whole is designed for a conventional extruding machine and is otherwise used according to conventional extrusion techniques.

The tip of the tubular guide 13; i.e., the outlet tip 31 of the nozzle 29, is substantially in alignment with the outlet land 28 of the punch 12 forming the internal wall of the sheath, and can end within said land 28, but it can also terminate beyond the outlet land 36 of the die 11, as shown on the FIG. 1. Preferably, the distance between the outlet tip 31 of the nozzle and the land 28 of the punch 12 (if the guide 13 is recessed), or between the outlet tip 31 of the nozzle and the outlet land 36 of the die 11 (if the guide 13 projects beyond the die 11) is on the order of a maximum of 4 mm.

The composite structure according to the invention consists essentially of a thermoplastic sheath 33 and an inner core 24. Any of the resins which remain thermoplastic after extrusion are suitable for use as the sheathing. These can be selected, for example, from the group of styrene, vinyl, acrylic or methacrylic or olefin polymers or copolymers, or from the flourinated resins, polyamides, polycarbonates, cellulose propionates and mixtures of these compounds. The term "thermoplastic resin" is also understood to mean extrudable resins which are thermoplastic after extrusion and can subsequently be cross-linked; this is the case, for example, with the synthetic or elastomeric rubbers, such as MDPE or the chlorosulfonated polyethylene or also the polyesters such as certain polyurethanes.

The inner core 24 of the composite can occur in the form of a powder, but also in the form of fibers or a structure, such as a strip or granules, of resin which is sensitive to the sheathing temperature. It can also occur in the form of fibers of any type, impregnated with a powder which is sensitive at the melting temperature of the sheath 33. Such powders are usually thermoplastic resin powders, but it is also possible to impregnate the fibers with a reagent such as an accelerator or polymerization agent which is capable of subsequently reacting under heat with the sheath. In general, the inner core 24 consists of a powder and/or fibers which are capable of having their physical appearance or structure damaged at the extrusion temperature of the sheath 33. The powder used in the core 24 of the material is usually selected from the group of compounds whose melting point, or failing that, whose decomposition temperature, is lower than the melting point of the thermoplastic material selected for the sheath 33.

One particularly interesting material according to the invention consists of a thermoplastic sheath containing a core comprising fibers, for example, made of textile, carbon or glass, impregnated with a powder which is sensitive to the melting temperature of the sheath.

Impregnation of the fibers with a powder prior to sheathing is a known process and can be done according to one conventional process by passing the fibers through a fluidized bed of powder as described in European Patent No. 0133825.

The composite structure according to the invention is made using the apparatus described above which permits the cooling of the inner core substance at the critical point of the process.

According to the process, a thermoplastic sheath is extruded through the channel 23 in the die, while at the same time the material 24 constituting the inner core 24 is introduced through the tip opposite the die tool of the guide 13, which may be cooled and serves as a gate and encounters the sheath after it emerges from the die tool; a cooling system is located substantially at the outlet of the die tool between the internal part of the sheath and the material constituting the core, so that the core cannot be affected by the temperature of the die tool or that of the emerging sheath material at 16. One practical cooling system, although not the only possible one, involves injecting cold air 35 at 25 into the channel 15 between the guide 13 and the hot wall of the die tool. Based on either the extent to which the guide projects into the die-tool outlet, or the degree of cooling at the internal outlet of the sheath, or a combination of the two means, it is possible to maintain all of the material being sheathed at a sufficiently low temperature to allow it to retain practically its original appearance during the entire sheathing operation with no significant deformation.

To improve the sizing of the composite material, or even to increase its cooling rate, it is possible to convey an opposing stream of air onto the external sheath at the die-tool outlet. This can be done, for example, by injecting air into the conduit 21 in the thermal barrier 20.

The material according to the invention has a number of applications, particularly in reinforcing parts, for example, by winding and heating the material on the part and then bonding the assembly together, or by depositing and heating a textile or a mat consisting of the composite material.

The invention will be further described in connection with the following examples which are set forth for purposes of illustration only.

EXAMPLE 1

Using a single-screw extrusion machine 30-24 D in diameter fitted with the die tool shown in the attached figure, a polyamide 6 sheath 2 mm in diameter is extruded at a rate of 760 grams/hour at an extrusion temperature at the die tool of 220° C.; simultaneously, a 320 tex roving, whose threads have previously been dipped in a polyamide 12 powder with a melting point of 170° C. and whose particle size is on the order of 10 microns, is introduced into the sheath through the water-cooled guide 13.

The ratio between fiber and powder is 25/75 by volume. Within the channel 15, air is circulated at a flow rate sufficient to produce fluidization of the powder in the vicinity of the sheathing zone.

EXAMPLE 2

Using the apparatus in Example 1, a polyamide 6 sheath 2 mm in diameter is extruded at a rate of 860 grams/hour and an extrusion temperature at the die tool of 225° C.; simultaneously, a powdered expansion agent (azodicarbonamide) with a decomposition temperature of 150° C. impregnated onto a 320 tex roving is introduced into the sheath through the water-cooled guide 13. The fiber/powder ratio is 46/54 by volume.

This produces a fiber-reinforced polyamide 6-azodicarbonamide composite capable of being subsequently heat-treated to exploit the expansion effects of the azodicarbonamide.

EXAMPLE 3

Example 1 is repeated utilizing a die-tool temperature of 225° C., a polyethylene sheath, a melting point 117° C., and an extrusion rate of 102 grams/hour.

As the sheath is being formed, a roving impregnated with powdered dicumyl peroxide with a reaction temperature of 120° C. is introduced into it. The fiber/powder ratio is 35/65 by volume.

This produces a composite structure which can subsequently be cross-linked with heat.

EXAMPLE 4

Example 1 is repeated using a die-tool temperature of 210° C., a polyamide 12 sheath, and an extrusion rate of 800 grams/hour.

As the sheath is being formed, the roving impregnated with powdered amide-block polyether with a melting point of 128° C. is introduced into the sheath. The fiber/powder ratio is 43/57 by volume.

This produces a composite which can be heat-treated to improve the final flexibility of the polyamide 12 thanks to the compatible polyether.

EXAMPLE 5

Example 4 is repeated, replacing the amide-block polyether with a polyamide 12 powder.

This produces a polyamide 12 sheath containing the glass fibers impregnated with polyamide 12 powder, which can subsequently be converted into a finished glass-fiber-reinforced product.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. In an extruding apparatus, for sheathing a core which is sensitive to the extrusion temperature of the sheathing material, of the type having a die tool formed of a die and a punch with respective outlet lands spaced apart in substantial alignment with each other and a core guide arranged such that the oulet end of said core guide is substantially in alignment with the outlet land of the punch, which outlet land of said punch forms the internal wall of the sheath, and having a channel between said guide and said punch for carrying a cooling fluid, which channel can extend as far as an interface between the sheath and the core at the outlet land of said punch, the improvement comprising a nozzle attached to said outlet end of said core guide and having lateral holes extending from said channel to the interior of said core guide so that at least to portion of said cooling fluid can be directed away from said sheath and core interface.

2. An extruding apparatus as in claim 1 wherein said nozzle has an outlet port with a diameter which is less than the internal diameter of said core guide.

3. An extruding apparatus as in claim 2 wherein the outlet port of said nozzle is substantially co-axial with said outlet lands of said punch and die.

4. An extruding apparatus as in claim 1 wherein said nozzle is in contact with said punch so that substantially all of the cooling fluid is directed through said lateral holes and away from said interface of said sheath and core.

5. An extruding apparatus as in claim 2 wherein said outlet port is located within a range of from 4 mm above said punch outlet land to 4 mm below said outlet land of said die, which outlet land of said die forms the exterior wall of said sheath.

6. An extruding apparatus as in claim 1 further comprising an optional cooling means for additional cooling of said core guide.

7. An extruding apparatus as in claim 1 further comprising a thermal barrier located adjacent said outlet land of said die.

8. An extruding apparatus as in claim 7 wherein said thermal barrier is in substantial contact with said die outlet land completely surrounding said die outlet land so that said sheath and core are shielded from the heat of extrusion.

9. An extruding apparatus as in claim 7 further comprising a means for cooling said thermal barrier.

10. An extruding apparatus as in claim 8 further comprising a means for coolig said thermal barrier.

* * * * *

UNITED STATES PATENT AND TRADEMARK OFFICE
CERTIFICATE OF CORRECTION

PATENT NO. : 4,699,579

DATED : October 13, 1987

INVENTOR(S) : Bourdon et al

It is certified that error appears in the above-identified patent and that said Letters Patent are hereby corrected as shown below:

Claim 1, appearing in Column 6, line 20, "to" should read --a--.

Signed and Sealed this

Fifteenth Day of March, 1988

Attest:

DONALD J. QUIGG

Attesting Officer

Commissioner of Patents and Trademarks